United States Patent
Itoh et al.

(10) Patent No.: US 6,208,541 B1
(45) Date of Patent: Mar. 27, 2001

(54) PWM INVERTER APPARATUS

(75) Inventors: Kazuyuki Itoh; Yoshihisa Okita; Katsuaki Tanaka, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/599,926

(22) Filed: Jun. 22, 2000

(30) Foreign Application Priority Data

Jul. 5, 1999 (JP) .................................................. 11-190674

(51) Int. Cl.$^7$ ...................................................... H02M 3/24
(52) U.S. Cl. ............................................. 363/98; 363/132
(58) Field of Search ................................ 363/17, 98, 132

(56) References Cited

U.S. PATENT DOCUMENTS 5,546,294 * 8/1996 Schutten et al. ........................ 363/17

FOREIGN PATENT DOCUMENTS 60-174069 7/1985 (JP) .

OTHER PUBLICATIONS

Jun–ichi Itoh and Isao Takahashi: "Silent High Efficiency Inverter"—entire document. No Date.
Isao Takahashi and Jun–ichi Itoh: "Development of a High Efficiency Inverter Without Audible Noise", TIIE Japan, vol. 116–D, No. 12, 1996, pp. 1205–1210. No Month.
Isao Takahashi, Jun–ichi Itoh and Guijia SU: "How to Get 99% Inverter Efficiency", 0–7803–1993–1/94, 1999 IEEE, pp. 971–976. No Month.

* cited by examiner

*Primary Examiner*—Shawn Riley
(74) *Attorney, Agent, or Firm*—Frishauf, Holtz, Goodman, Langer & Chick, P.C.

(57) ABSTRACT

This PWM inverter apparatus includes a first and second current control type semiconductor switching elements connected in series which are connected in parallel to a DC power supply. An output is generated by alternately switching the first and second semiconductor switching elements. Resistive semiconductor switching elements having a higher switching speed than the first and second semiconductor switching elements and a resistance-to-current characteristics producing a voltage drop are respectively connected in parallel to respective the first and second semiconductor switching elements. In a half cycle of an alternating output current, while the output current is higher than a predetermined rate with respect to a peak current, a switching timing is controlled to produce a switching control signal to the resistive semiconductor switching elements ahead of a switching control signal to the first and second semiconductor switching elements, and to terminate the switching control signal to the resistive semiconductor switching elements at a time when a predetermined period passes after the switching control signal given to the first and second semiconductor switching elements has been terminated. In the half cycle of the alternating output current, while the output current is lower than the predetermined rate with respect to the peak current, the switching timing is controlled to generate the output by the switching operation only of the resistive semiconductor switching elements.

5 Claims, 7 Drawing Sheets

FIG. 1

SS2,SS3,SS4,SS5: semiconductor switch
(BJT)
D2,3,4,5: parallel connection
diode for semiconductor
switch

FIG. 2

SS2, SS3, SS4, SS5: semiconductor switch (BJT)
SS9, SS10, SS11, SS12: semiconductor switch (FET)

PWM INVERTER APPARATUS

BACKGROUND OF THE INVENTION

1. Field of the invention

The present invention relates to a PWM inverter apparatus for converting DC power to AC power or DC power.

2. Prior Art

Figure 1:
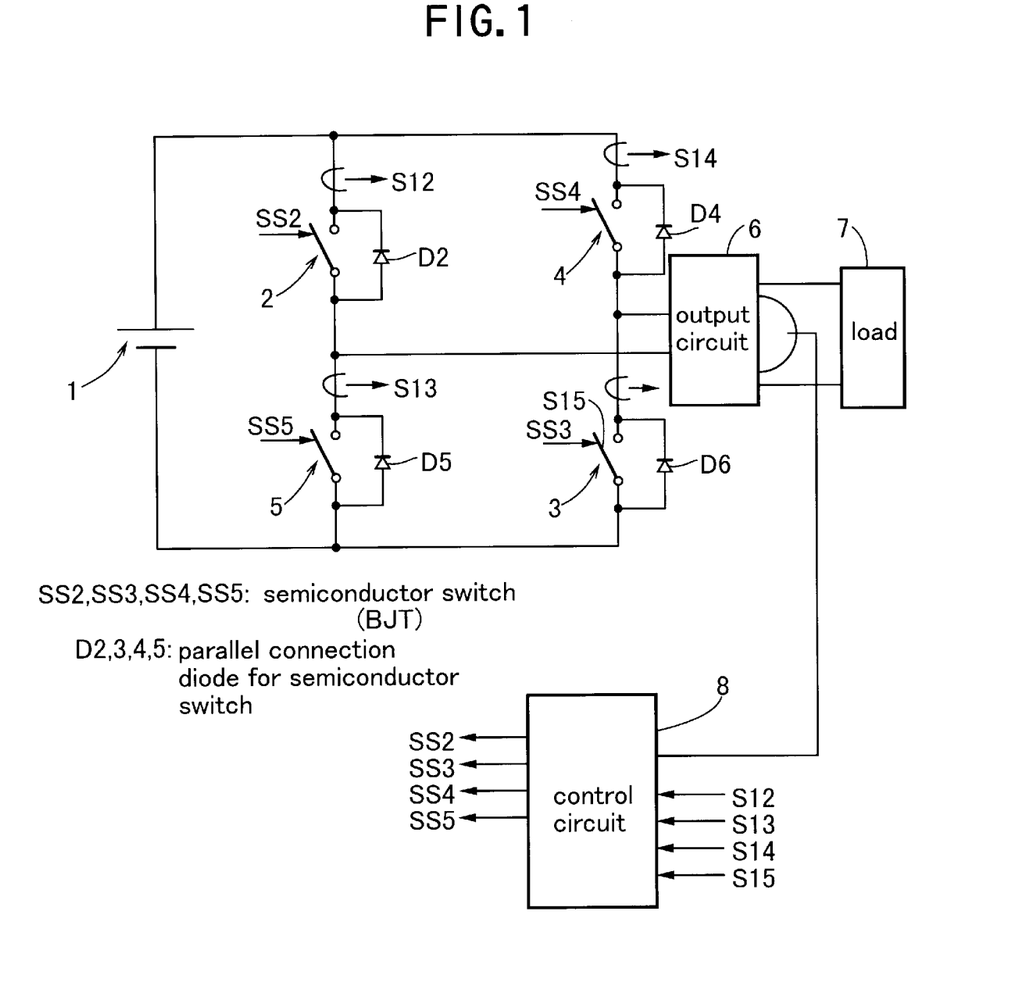
FIG. 1 is a circuit diagram showing one example of a conventional inverter circuit.

Conventionally, in order to obtain AC voltage from a DC power supply, PWM inverter have widely been used. A PWM inverter is designed to alternate the polarity of voltage applied to a load by use of semiconductor switches to generate AC voltage. The PWM inverter is comprised of a plurality of semiconductor switches which are connected in a bridge and on-off controlled by driving outputs from a drive circuit. The driving output from the drive circuit alternatively turns on and off semiconductor switches which are diagonally disposed in the bridge circuit respectively, so that an AC voltage may be generated on both sides of the load. In FIG. 1, there is shown an example of an inverter circuit, including two semiconductor switching elements 2, 5 connected in series. The switching elements 2, 5 are connected in parallel with a DC power source 1. Additional two semiconductor switching elements 4, 3 connected in series each other are also respectively connected in parallel to the DC power source 1 and semiconductor switching elements 2, 5. Diodes D2, D3, D4, D5 are respectively connected in parallel to the switching elements 2, 3, 4, 5 such that their polarities are opposite to that of the DC power supply 1. A load 7 is connected between the point of connection between the switching elements 2, 5 and the point of connection between the switching elements 4, 3 through an output circuit 6 so as to configure a bridge circuit.

A control circuit 8 receives an output current or output voltage of the output circuit 6 as one of input signals. Current detectors are provided for delecting current flowing each of the switching elements 2, 3, 4, 5. Each the current detectors generates a current signal S12, S13, S14, S15 corresponding to the current in each of the switching elements, and these current signals S12, S13, S14, S15 are applied to the control circuit 8. The control circuit 8 generates switch control signals SS2, SS3, SS4, SS5 for controlling respective switching timings of the switching element 2, 3, 4, 5 in response to these input signals to control the operation of the switching elements 2, 3, 4, 5.

In this inverter circuit, the switching element 2 and the switching element 3 are paired and the switching element 4 and the switching element 5 are also paired. Thus, one and the other of pairs of switching elements are alternately turned on and off. It has been pointed out as one of the problems of this type of circuit that the switching period for turning on and turning off the semiconductor switching element is relatively long and this switching period results in a restriction in operating frequency, so that it is impossible to obtain an inverter circuit which can operate in high frequency.

Japanese Patent Laid-Open Publication No. Sho 60-174069 proposes, in an inverter circuit as shown in FIG. 1 to provide additional semiconductor switching elements of faster switching speed and of higher turn-on voltage connected in parallel to respective ones in one of the series-connected pairs of the semiconductor switching elements. Referring to the circuit shown in FIG. 1, the proposal is to connect additional semiconductor switches 12, 13 in parallel respectively with the semiconductor switching elements 4, 3. In the proposed inverter circuit, an output voltage is applied to the load by first applying a drive signal to the switching element 2 and then to the switching element 13 connected in parallel to the switching element 3, after the switching element 2 has completely become conductive. Then, immediately after the switching element 13 has completely become conductive, a drive signal is given to the switching element 3 connected in parallel to the switching element 13 to make the switching element 3 conductive. When the power supply from the DC power source 1 to the load is to be cut off, the drive signal to the switching element 3 is first cut off. Then, immediately after the current has been completely shifted to the switching element 13 connected in parallel to the switching element 3, the switching element 13 is turned off.

The construction and control of the inverter circuit described in the above Laid-Open Publication intends to reduce switching loss. However, in this circuit, the switching elements having faster switching speed and higher turn-on voltage are arranged in parallel only to two switching elements among 4 switching elements comprising the bridge circuit and no measure is taken to other two switching elements. Therefore, in case where the load is inductive, the switching elements having no such additional switching elements connected in parallel thereto may have no improvement in turn-on loss because circulating current still exists during the timing when these switching elements are to be turned on and off. Besides, drive signals for driving the switching elements require to be set up in proper order, resulting in increased difficulty of control.

Further, in an article titled "Noise-Free High Efficiency Inverter", the Institute of Electrical Engineers of Japan, Annual Conference of Industry Application Society, the collected papers No. 214, 1995, there is proposed to connect an Insulated Gate Bipolar Transistor (IGBT) having small switching loss but large conductive loss in parallel to a main transistor having small conductive loss but large switching loss, and a switching timing is controlled so that the IGBT is always turned on at the time when the main transistor is to be switched, for reducing both switching loss and conductive loss. In this proposed circuit and control, the minimum conduction time of the IGBT is determined by a sum of the switching time for turning on, the conduction time and the switching time for turning off of the main transistor. However, since the switching time of a conventional transistor is generally severalfold longer in comparison with the switching time of the IGBT, the control taught here cannot achieve the high frequency operation of inverters.

SUMMARY OF THE INVENTION

Considering the circumstance described above, It is an object of the present invention to provide a PWM inverter to facilitate its reduction in size and weight as well as having capability to achieve reduced switching loss and high frequency operation with high efficiency.

To achieve the aforementioned object, a PWM inverter apparatus in accordance with the present invention comprises a first and second current control type semiconductor switching elements connected in series each other which are connected in parallel to a DC power supply. Diodes are respectively connected in parallel to respective ones of the first and second semiconductor switching elements with the polarity opposite that of the DC power supply, and the line connecting the first and second semiconductor switching elements is connected to an output circuit. An output is then generated by alternately switching the first and second semiconductor switching elements. Resistive semiconductor switching elements are respectively connected in parallel to respective ones of the first and second semiconductor switching elements, the resistive semiconductor element having a higher switching speed than the first and second semiconductor switching elements and possessing a resistance-to-current characteristics which causes a voltage drop in accordance with the amount of current. In a half cycle of an alternating output current, during a time period wherein the output current is higher than a predetermined rate with respect to a peak current, the switching timing is controlled so that the switching control signal to the resistive semiconductor switching elements is produced in advance of a switching control signal to the first and second semiconductor switching elements, the switching control signal to the resistive semiconductor switching elements being terminated after a predetermined period after the switching control signal to the first and second semiconductor switching elements has been terminated. Further, in the half cycle of the alternating output current, during a time period wherein the output current is lower than the predetermined rate with respect to the peak current, the switching timing is controlled so that the switching control signal to the first and second semiconductor switching elements is not produced to thereby generate the output by the switching operation only of the resistive semiconductor switching elements.

In another aspect of the present invention, the inverter apparatus is provided with another set of current control type semiconductor switching elements, i.e. a third and fourth current control type semiconductor switching elements connected in series each other, in addition to the series connected first and second current control type semiconductor switching elements. The set of third and fourth semiconductor switching elements is connected in parallel to the first and second semiconductor switching elements. The line connecting the third and fourth semiconductor switching elements is connected to the output circuit as well as the first and second semiconductor switching elements. Resistive semiconductor switching elements having a higher switching speed than the third and fourth semiconductor switching elements and showing a resistance-to-current characteristic to cause a voltage drop are also connected in parallel to respective ones of the third and fourth semiconductor switching elements. In the inverter of this aspect, the output is generated by alternately switching the set of the first and second semiconductor switching elements and the set of the third and fourth semiconductor switching elements. Other respects are as with the foregoing inverter apparatus.

In the inverter of the present invention, the resistive semiconductor switching elements are respectively connected in parallel to respective ones of the first and second semiconductor switching elements, or to respective ones of the first to fourth semiconductor switching elements and, in a half cycle of alternating output current, during a first period when the output current is higher than a predetermined rate with respect to a peak current, the switching control signal given to the resistive semiconductor switching elements is produced in advance of the switching control signal given to the first and second semiconductor switching elements, and terminated at a time when a predetermined period has passed after the switching control signal given to the first and second semiconductor switching elements has been terminated. Thus, during this period, the resistive semiconductor switching elements having small switching loss is turned on ahead of the current control type semiconductor switching elements and then turned off later than the current control type semiconductor switching elements, which enables switching loss to be significantly reduced. Further, in the half cycle of alternating output current, during a second period when the output current is lower than the predetermined rate with respect to the peak current, control is made to generate the output by the switching operation only of the resistive semiconductor switching elements, which enables the switching operation in the vicinity of zero-crossing of the output current. Voltage drop across the resistive semiconductor switching elements can also be suppressed to a low level because a switching time of the resistive semiconductor switching elements is severalfold to tenfold shorter even in comparison with regular bipolar transistors and insulated gate bipolar transistors.

In the present invention, MOS filed-effect transistors may be used for the resistive semiconductor switching elements. In the present invention, the current which flows through the switching elements during the second period is smaller than that during the first period. Thus, when the MOS field-effect transistors are used as the resistive semiconductor switching elements, since the MOS field-effect transistors shows extremely low voltage drop characteristic even in comparison with other similar class of transistors, for example, Insulated Gate Bipolar Transistor (IGBT), switching loss can correspondingly be reduced.

The output current level which is used for determining the first and the second periods may be determined by detecting an output current at the output circuit. In another aspect, it may also be determined by detecting current at the switching elements.

These and other aspect of the present invention are apparent in the following detailed description and claims, particularly when considered in conjunction with the accompanying drawings.

DETAILED DESCRIPTION OF THE PREFERED EMBODIMENTS

With reference to the drawings, embodiments of the present invention will be described hereinafter.

Figure 2:
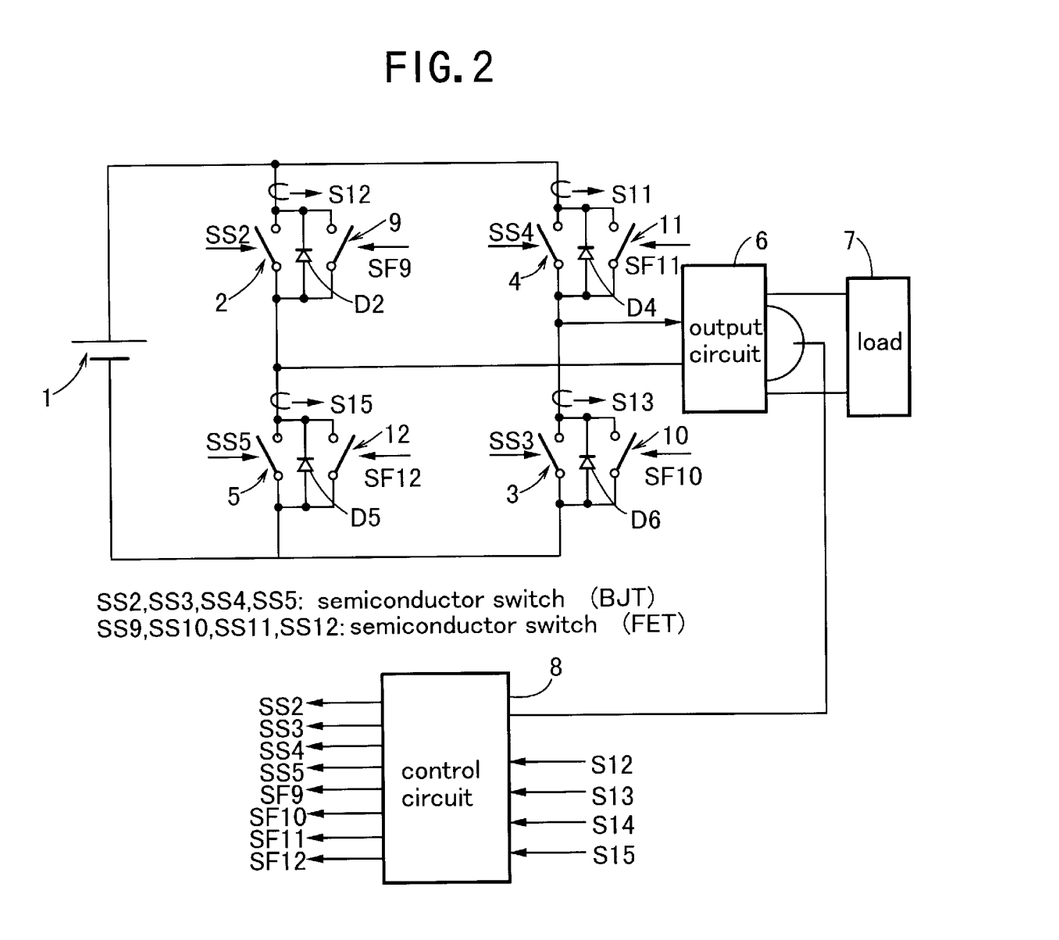
FIG. 2 is a circuit diagram similar to FIG. 1 but showing one embodiment of the inverter circuit according to the present invention.

FIG. 2 is a diagram similar to FIG. 1 but showing an inverter apparatus implementing the present invention. In FIG. 2, components corresponding to those in FIG. 1 are designated by same reference numerals and the detailed description thereof will be omitted. Semiconductor switching elements 2, 3, 4, 5 are made of Bipolar Junction type Transistors (BJTs) of current control type. In the illustrated embodiment of the present invention, a resistive semiconductor switching element 9 made of a MOS field-effect transistor is connected in parallel to the semiconductor switching element 2. Similarly, a resistive semiconductor switching element 12 made of a MOS field-effect transistor is connected in parallel to the semiconductor switching element 5 which is connected in series to the semiconductor switching element 2, and resistive semiconductor switching elements 11, 10 made of MOS field-effect transistors are respectively connected in parallel to respective ones of the semiconductor switching elements 4, 3 which are respectively connected in parallel to the semiconductor switching elements 2, 5.

The control circuit 8 receives an output current or output voltage signal from the output circuit 6, a switching element current signal S12 representing the current through the set of switching elements 2, 9, a switching element current signal S13 representing the current through the set of switching elements 3, 10, a switching element current signal S14 representing the current through the set of switching elements 4, 11, and a switching element current signal S15 representing the current through the set of switching elements 5, 12. The control circuit 8 generates drive signals SS2, SS3, SS4, SS5 for use in controlling switching operation of the semiconductor switching elements 2, 3, 4, 5 made up of bipolar junction type transistors, as well as in the circuit shown in FIG. 1. The control circuit 8 also generates drive signals SF9, SF10, SF11, SF12 for use in controlling switching operation of the resistive semiconductor switching elements 9, 10, 11, 12 made up of MOS field-effect transistors. These drive signals are given to respective switching elements to control these switching elements.

Figure 3:
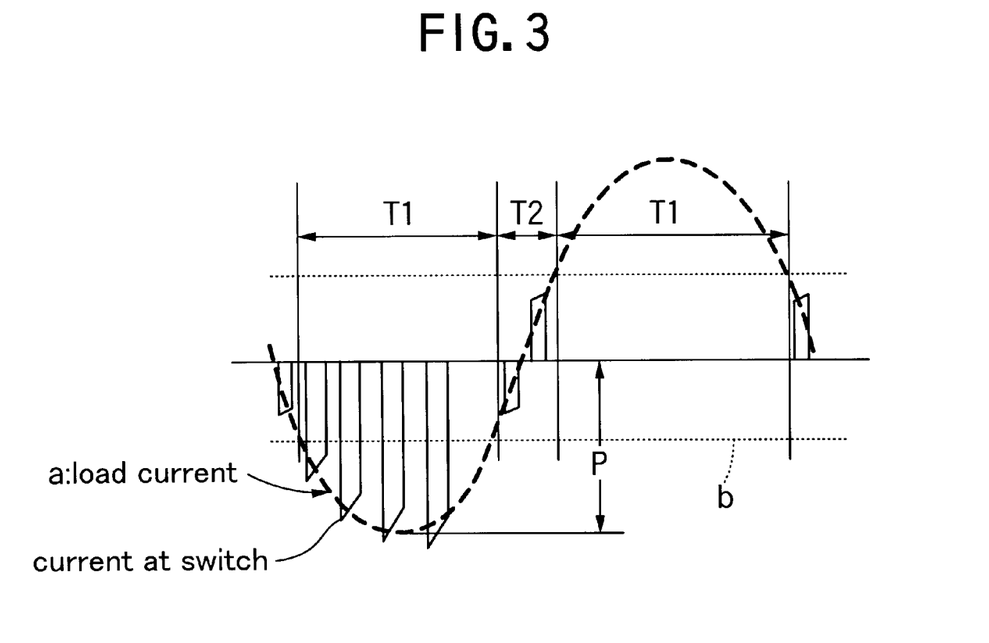
FIG. 3 is a diagram showing a relationship between an output waveform and a control period of the embodiment shown in FIG. 2.
Figure 4:
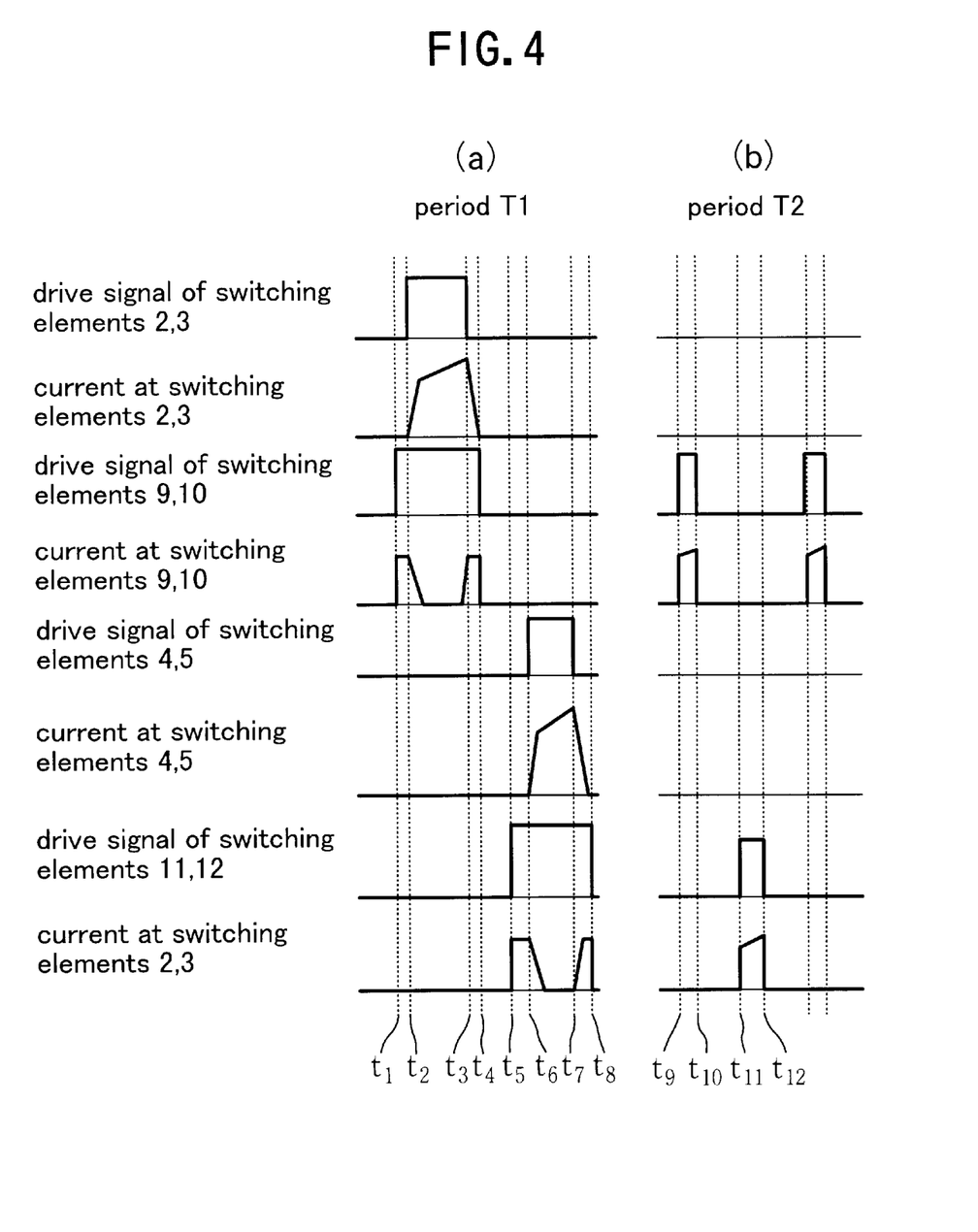
FIG. 4 is a waveform diagram showing operation timings of switching elements in the embodiment shown in FIG. 2, wherein timings during the period T1 are shows in FIG. 4(*a*) and timings during the period T2 are shows in FIG. 4(*b*)

FIG. 3 and FIG. 4 show switching operation timings of the inverter apparatus shown in FIG. 2. A broken line in FIG. 3 shows a load current which varies in sine wave and this load current corresponds to an output current of the inverter apparatus. In controlling the switching timings in accordance with the present invention, a particular level of rate with respect to a peak current value P is determined, for example to the level of 45% with respect to a peak current value P as indicating by b in FIG. 3. By using this predetermined level, the control of the switching timings are varied between the first period T1 wherein the output current is higher than this level b and the second period wherein the output current is lower than this level b.

With reference to FIG. 4, FIG. 4(a) is a wave form diagram showing the drive signal and the current in each of the switching elements during the first period T1. At timing t1 in the first period, the drive signals SF9, SF10 are given to the switching elements 9, 10 so that current is started to flow through these switching elements 9, 10. Then, at timing t2 having a certain time delay to timing t1, drive signals SS2, SS3 are given to the switching elements 2, 3 connected in parallel to the switching elements 9, 10 so that current is also started to flow through these switching elements 2, 3. As soon as the current though the switching elements 2, 3 rises, the current though the switching elements 9, 10 starts to decrease. Then, at timing t3, the drive signals to the switching elements 2, 3 are cut off so that the current though the switching elements 2, 3 drops. At timing t4 when the current at the switching elements 2, 3 becomes zero, the drive signals to the switching elements 9, 10 are cut off so that the current though the switching elements 9, 10 decreases to zero.

Then, at timing t5, drive signals to the switching elements 11, 12 are turned on so that the current through the switching elements 11, 12 is started to flow. Then, after a predetermined time delay, at timing t6, the drive signals to the switching elements 4, 5 are turned on so that the current though the switching elements 4, 5 rises. As a result, the current though the switching elements 11, 12 begins to decrease. Then, at timing t7, the drive signals to the switching elements 4, 5 are cut off so that the current though the switching elements 4, 5 is decreased to zero. As the current though the switching elements 4, 5 decreases, the current though the switching elements 11, 12 correspondingly increases. When the current though the switching elements 4, 5 reaches zero at timing 8, the drive signals to the switching elements 11, 12 are cut off so that the current at the switching elements 11, 12 decreases to zero. In this manner, during the period T1, pulses having sizes in conformity with the sine wave as shown in FIG. 3 are formed by repeating the operation timing control for the switching elements 2, 3 and the switching elements 9, 10 and the operation timing control for the switching elements 4, 5 and the switching elements 11, 12. The operation timings of the switching elements 2, 3 and the switching elements 4, 5 and the operation timings of the switching elements 9, 10 and the switching elements 11, 12 can easily be controlled, for example, by setting up two different levels with respect to a reference waveform, such as triangular wave or the like, and then determining the aforementioned operation timing as the timing when the reference waveform crosses respective ones of these two levels.

During the period T2 when the output is lower than the level b, at timing t9 as shown in FIG. 4(b), the drive signals of the switching element 9, 10 are turned on so that the current starts to flow through the switching elements 9, 10. Then, at timing t 10, the drive signals of the switching elements 9, 10 are cut off so that the current though the switching elements 9, 10 decreases to zero. Then, at timing t 11, the drive signals of the switching element 11, 12 are turned on so that the current starts to flow through the switching elements 11, 12. The current decreases to zero by the drive signals of the switching elements 11, 12 being cut off at timing t 12. In this manner, output pulses shown in FIG. 3 are formed by alternately repeating the operation timing control for the switching elements 9, 10 and the operation timing control for the switching elements 11, 12. During the period T2, only the elements 9, 10, 11, 12 of the resistive semiconductor switching elements are turned on and off.

Figure 5:
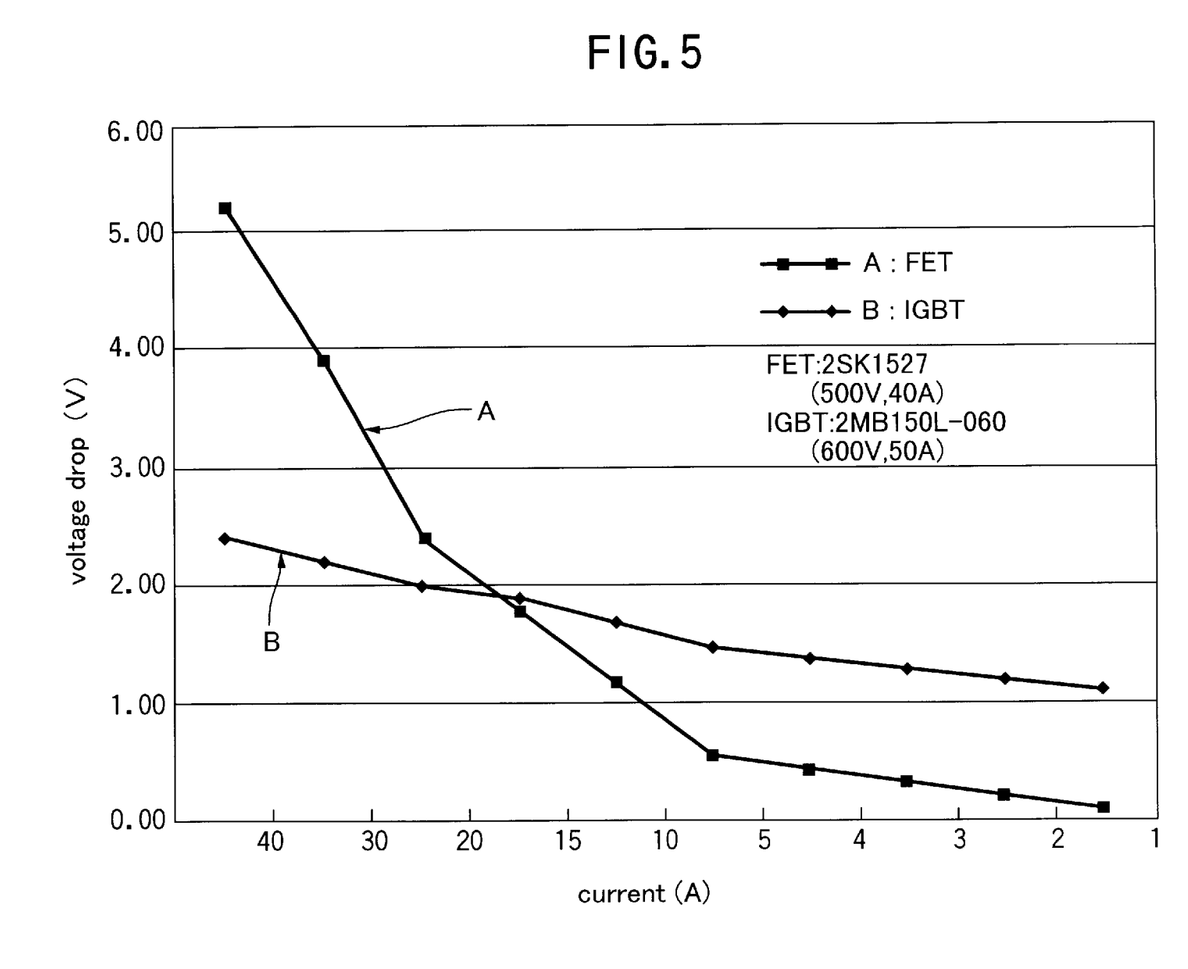
FIG. 5 is a diagram showing current/voltage drop characteristic of typical insulated gate bipolar transistor and field-effect transistor.

FIG. 5 shows current/voltage drop characteristic of typical Field-Effect Transistor (FET) and Insulated Gate Bipolar Transistor (IGBT). The transverse axis indicates a current value across the transistors and the current value decreases from left to right. The vertical axis indicates a voltage drop value across these transistors and the voltage drop value increases upwards. The polygonal line A shows a data of the field-effect transistor and the polygonal line B shows a data of the insulated gate bipolar transistor. As apparent from FIG. 5, the field-effect transistor has lower voltage drop characteristic than the insulated gate bipolar transistor in the operation area where the current value is low. In the present invention, during the period T2 when the current value is low, the operation timing is determined only by the control of the resistive semiconductor switching elements, such as field-effect transistors, which enables resistive loss to be significantly reduced during the period T2.

Figure 6:
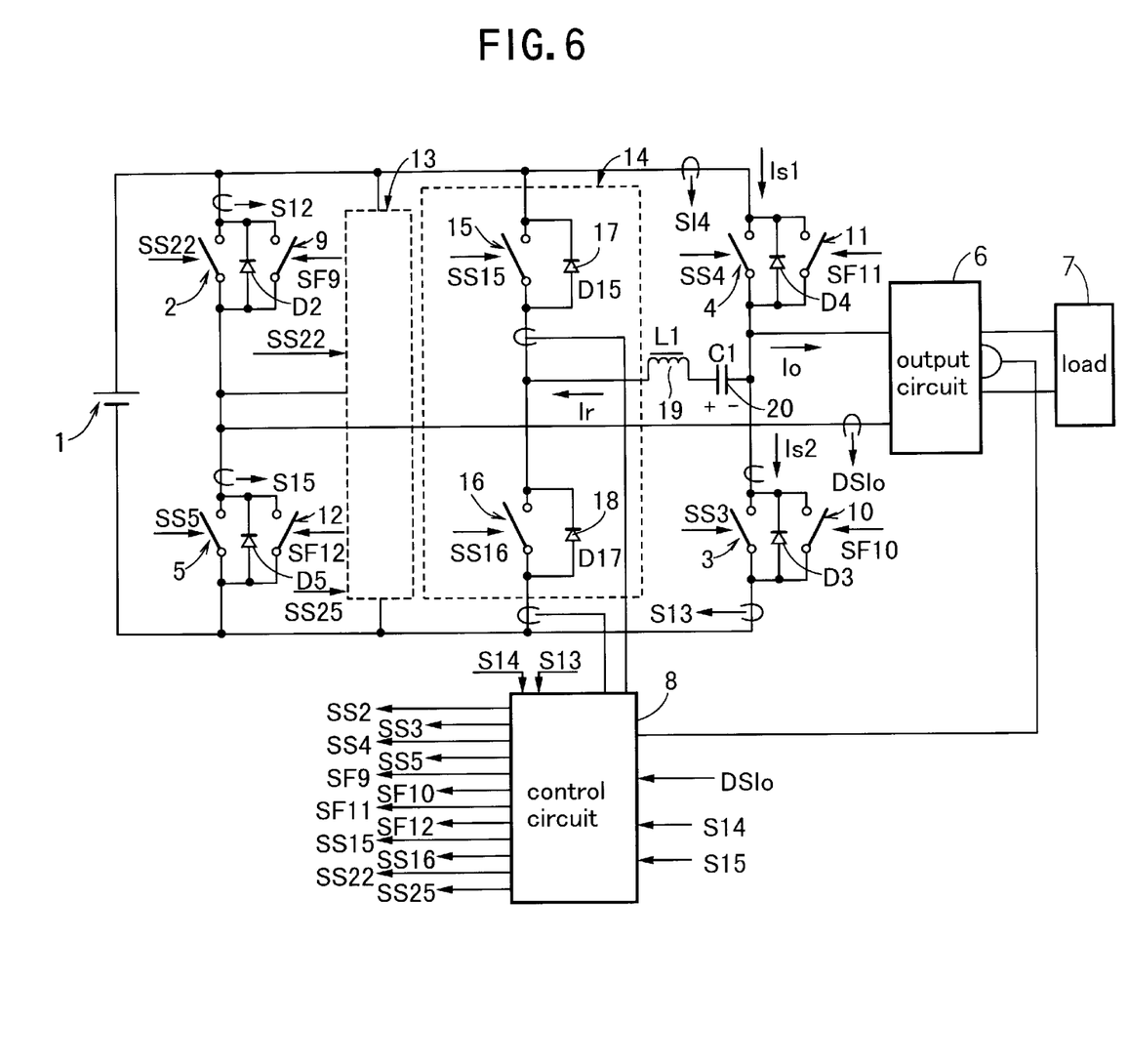
FIG. 6 is a circuit diagram showing a second embodiment of the present invention, similar to FIG. 2.
Figure 7:
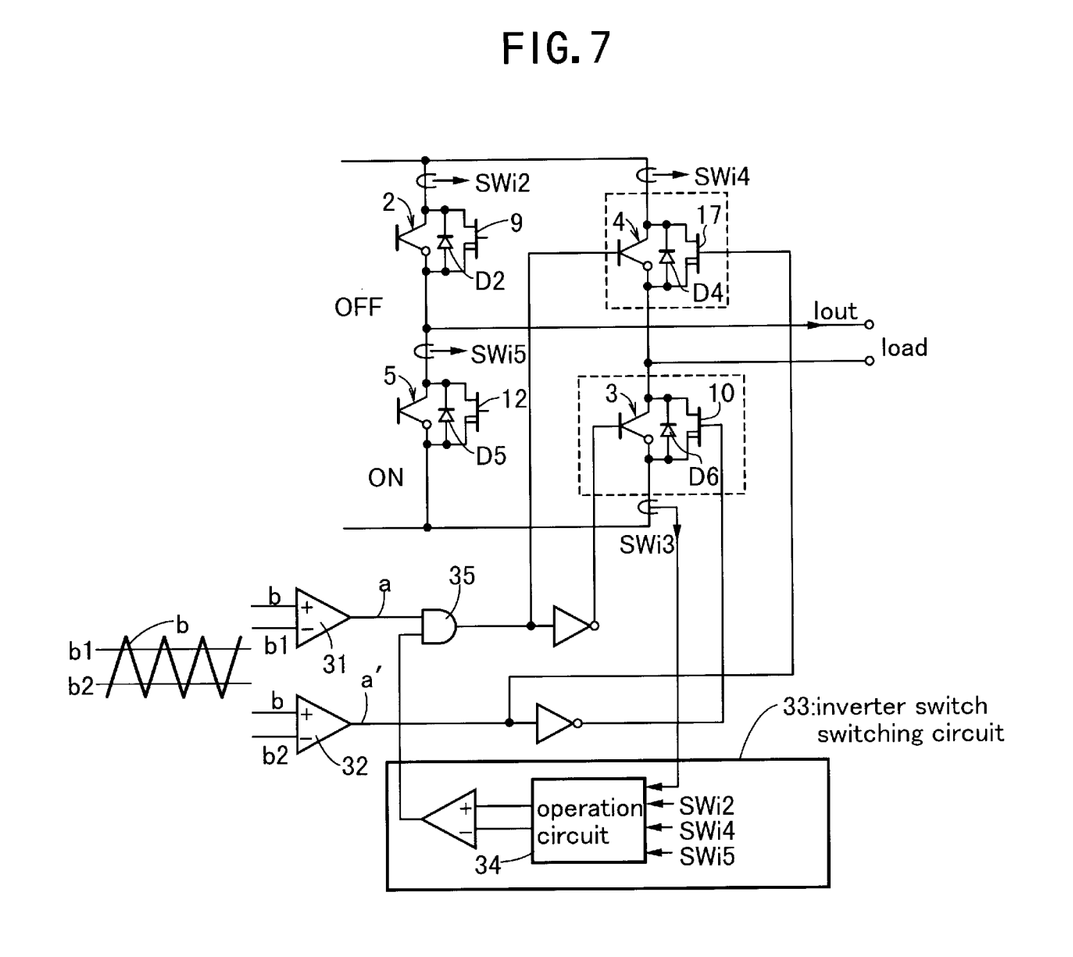
FIG. 7 is a diagram showing one example of a control circuit.

FIG. 6 shows another embodiment of the present invention. In this embodiment, auxiliary resonance circuits 13, 14 is added to the inverter circuit shown in FIG. 2. As representatively shown in the resonance circuit 14, these resonance circuits are provided with semiconductor switching elements 15, 16 connected in series each other and these switching elements 15, 16 are connected in parallel to the switching elements 4, 3. Diodes 17, 18 are respectively connected in parallel to respective ones of at least the switching elements 15, 16 with the polarity opposite to that of the DC power supply 1. A line connecting the switching elements 15, 16 is connected to the line connecting the switching elements 4, 3 through an inductor 19 and a capacitor 20. A current detector is provided for detecting current at the switching elements 15, 16 and the signal from the current detector is introduced to the control circuit 8. Drive signals SS15, SS16 for driving the switching elements 15, 16 of the resonance circuit 14 are formed by the control circuit 8 and then given to the switching elements 15, 16. The resonance circuit 13 is formed in the same manner as the resonance circuit 14 and then connected to the switching elements 2, 5 which are connected in series each other. In FIG. 6, SS22 and SS25 indicate drive signals for driving switching elements (not shown) within the resonance circuit 13. By virtue of providing these resonance circuits 13, 14, it becomes possible that the semiconductor switching elements 2, 3, 4, 5 having low switching speed can be turned on and off under zero current condition by utilizing resonance phenomenon during the period T1. FIG. 7 shows one example of the control circuit according to the present invention. This control circuit is provided with comparators 31, 32.

A reference signal corresponding to higher level b1 between the two levels b1, b2 is introduced to a reference signal terminal of the comparator 31 and a reference signal corresponding to lower level b2 is introduced to a reference signal terminal of the comparator 32. A triangular wave reference signal b is applied to another input terminal of each of the comparators 31, 32. Thus, when the reference signal b is higher than the level signal b1, a signal "a" is produced from the comparator 31, while a signal "a'" is produced from the comparator 32 when the reference signal b is higher than the level signal b2. Since the level signal b1 is higher than the level signal b2, the signal "a'" from the comparator 32 is originated ahead of the signal "a" and also terminated later than the signal "a". The control circuit is further provided with an inverter switch selecting circuit 33 having an operation circuit 34 to which current signals representing each current at the switching elements are applied. When the current at each of the switching elements is equal to or less than a predetermined rate with respect to the output current, the operation circuit 34 leads its output signal to an OR circuit 35. An output of the comparator 31 is also applied to the OR circuit 35. Thus, during the period T2, when a current passing through one set of switching elements, for example the set of switching elements 4, 11 or the set of switching elements 3, 10, becomes lower than the predetermined rate in relation to the output current, the OR circuit 35 blocks the output from the comparator 31 to present it to pass through the switching elements. These control circuit enables the operation timing of the above mentioned semiconductor switch element to be controlled.

What is claimed is:

1. A PWM inverter apparatus including a first and second current control type semiconductor switching elements connected in series and connected in parallel with a DC power supply, diodes being respectively connected in parallel with respective ones of said first and second semiconductor switching elements with polarity opposite to that of said DC power supply, a line connecting said first and second semiconductor switching elements being connected to an output circuit, an output being generated by alternately switching said first and second semiconductor switching elements, said PWM inverter apparatus comprising:

resistive semiconductor switching elements having a higher switching speed than said first and second semiconductor switching elements and a resistance-to-current characteristics producing voltage drop, said resistive semiconductor switching elements being respectively connected in parallel to respective ones of said first and second semiconductor switching elements wherein in a half cycle of an alternating output current, while said output current is higher than a predetermined rate with respect to a peak current, a switching timing is controlled to produce a switching control signal to said resistive semiconductor switching elements in advance of a switching control signal to said first and second semiconductor switching elements, said switching control signal to said resistive semiconductor switching elements being terminated at a time when a predetermined period passes after said switching control signal to said first and second semiconductor switching elements has been terminated, and in the half cycle of the alternating output current, while said output current is lower than the predetermined rate with respect to the peak current, said switching timing is controlled to generate the output by the switching operation only of said resistive semiconductor switching elements.

2. A PWM inverter apparatus including a first and second current control type semiconductor switching elements connected in series, a third and fourth current control type semiconductor switching elements connected in series, said first and second current control type semiconductor switching elements and said third and fourth current control type semiconductor switching elements being respectively connected in parallel with DC power supply, diodes being respectively connected in parallel to respective ones of said first, second, third and fourth semiconductor switching elements with polarity opposite to that of said DC power supply, a line connecting said first and second semiconductor switching elements and a line connecting said third and fourth semiconductor switching elements being respectively connected to an output circuit, an output being generated by alternately switching a set of said first and second semiconductor switching elements and a set of said third and fourth semiconductor switching elements, said PWM inverter apparatus comprising:

resistive semiconductor switching elements having a higher switching speed than said first, second, third and fourth semiconductor switching elements and a resistance-to-current characteristics producing a voltage drop being respectively connected in parallel to respective ones of said first, second, third and fourth semiconductor switching elements;

wherein in a half cycle of an alternating output current, while said output current is higher than a predetermined rate with respect to a peak current, a switching timing is controlled to produce a switching control signal to said resistive semiconductor switching elements in advance of a switching control signal to said first, second, third and fourth semiconductor switching elements, said switching control signal to said resistive semiconductor switching elements being terminated at a time when a predetermined period passes after said switching control signal to said first, second, third and fourth semiconductor switching elements has been terminated, and in the half cycle of the alternating output current, while said output current is lower than the predetermined rate with respect to the peak current, said switching timing is controlled to generate the output by the switching operation only of said resistive semiconductor switching elements.

3. A PWM inverter apparatus as defined in claim 2, further including a resonance circuit having an inductor and capacitor, said resonance circuit being connected to each of a circuit of the first and second semiconductor switching elements and a circuit of the third and fourth semiconductor switching elements.

4. A PWM inverter apparatus as defined in claim 1, wherein a MOS field-effect transistor is used as said resistive semiconductor switching element and a bipolar junction type transistor is used as said current control type semiconductor switching element.

5. A PWM inverter apparatus as defined in claim 2, wherein a MOS field-effect transistor is used as said resistive semiconductor switching element and a bipolar junction type transistor is used as said current control type semiconductor switching element.

* * * * *